(12) United States Patent
Gazzetti et al.

(10) Patent No.: US 11,605,028 B2
(45) Date of Patent: Mar. 14, 2023

(54) METHODS AND SYSTEMS FOR SEQUENTIAL MODEL INFERENCE

(71) Applicant: INTERNATIONAL BUSINESS MACHINES CORPORATION, Armonk, NY (US)

(72) Inventors: Michele Gazzetti, Dublin (IE); Srikumar Venugopal, Dublin (IE); Christian Pinto, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 861 days.

(21) Appl. No.: 16/551,466

(22) Filed: Aug. 26, 2019

(65) Prior Publication Data

US 2021/0065063 A1 Mar. 4, 2021

(51) Int. Cl.
*G06N 20/20* (2019.01)
*G06N 5/04* (2023.01)
*H04L 67/61* (2022.01)
*G06N 5/046* (2023.01)
*H04L 1/00* (2006.01)

(52) U.S. Cl.
CPC .......... *G06N 20/20* (2019.01); *G06N 5/04* (2013.01); *G06N 5/046* (2013.01); *H04L 1/0017* (2013.01); *H04L 67/61* (2022.05)

(58) Field of Classification Search
CPC .......... G06N 20/20; G06N 5/04; G06N 5/046; H04L 1/0017; H04L 67/61; H04L 67/306

USPC ........................................................ 706/21
See application file for complete search history.

(56) References Cited

U.S. PATENT DOCUMENTS

| | | | |
|---|---|---|---|
| 2014/0095708 A1* | 4/2014 | Hayes | G06N 5/025 709/224 |
| 2018/0165596 A1 | 6/2018 | Abrams | |
| 2018/0241843 A1* | 8/2018 | Bardhan | G06F 9/5066 |
| 2019/0156247 A1* | 5/2019 | Faulhaber, Jr. | G06N 3/08 |

OTHER PUBLICATIONS

"DeepRT: predictable deep learning inference for cyber-physical systems"/KANG/Springer Science+Business Media, LLC, part of Springer Nature 2018/(30 Pages).
"QoS-Aware Scheduling of Heterogeneous Servers for Inference in Deep Neural Networks"/FANG/CIKM'17, Nov. 6-10, 2017, Singapore/(4 Pages).

* cited by examiner

*Primary Examiner* — Juan A Torres
(74) *Attorney, Agent, or Firm* — Griffiths & Seaton PLLC

(57) ABSTRACT

Embodiments for processing data with multiple machine learning models are provided. Input data is received. The input data is caused to be evaluated by a first machine learning model to generate a first inference result. The first inference result is compared to at least one quality of service (QoS) parameter. Based on the comparison of the first inference result to the at least one QoS parameter, the input data is caused to be evaluated by a second machine learning model to generate a second inference result.

21 Claims, 15 Drawing Sheets

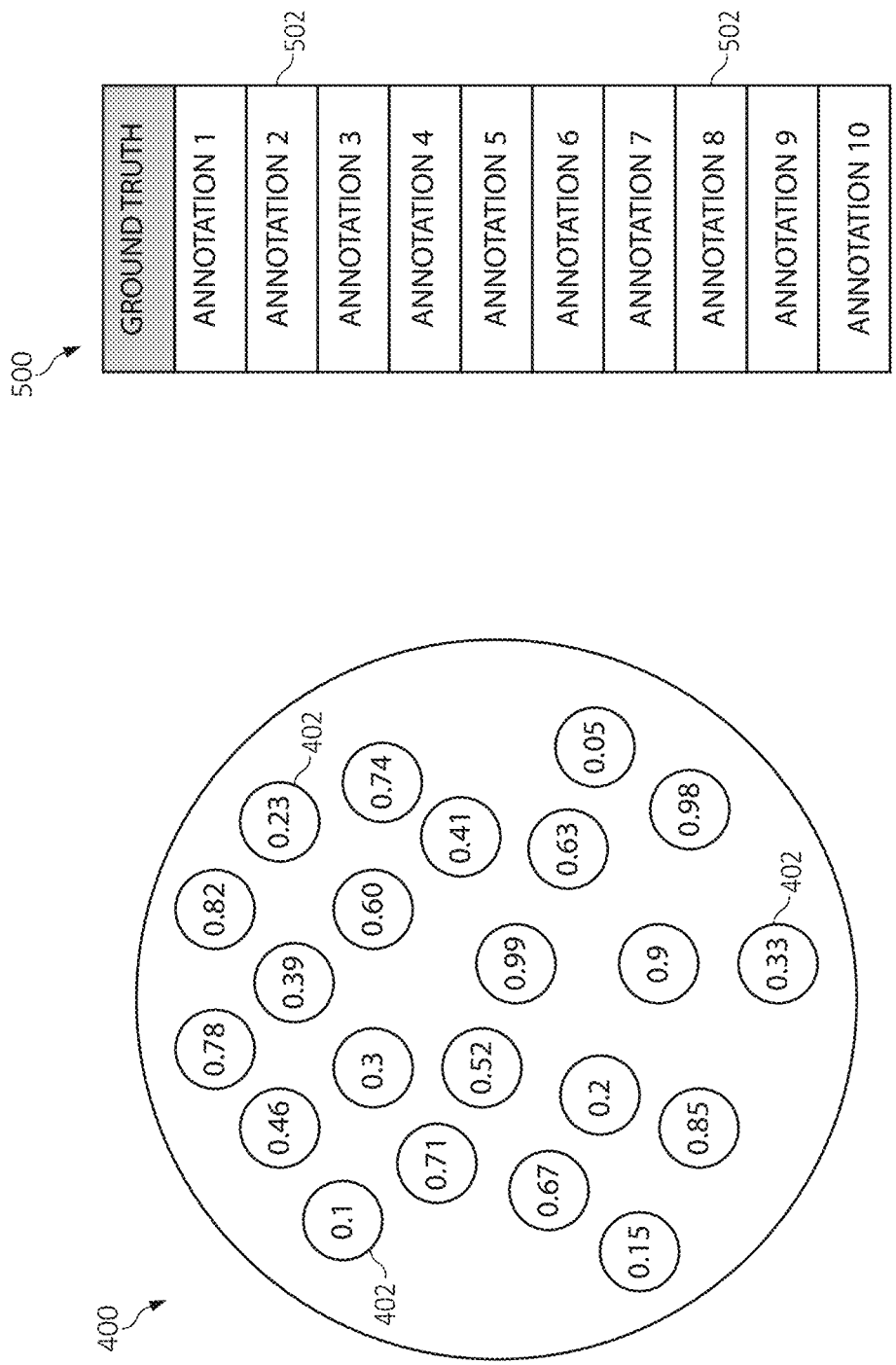

700

| FRACTION OF GROUND TRUTH DETECTED | AMOUNT OF GOOD PREDICTIONS | SCORE THRESHOLD |
|---|---|---|
| 10% | 100% | 0.99 |
| 20% | 100% | 0.98 |
| 30% | 100% | 0.9 |
| 40% | 80% | 0.82 |
| 50% | 71% | 0.74 |
| 60% | 60% | 0.63 |
| 70% | 63% | 0.6 |
| 80% | 57% | 0.41 |
| 90% | 56% | 0.23 |
| 100% | 50% | 0.05 |

|    | RECALL_THRESH | PRECISION | SCORE    |
|----|---------------|-----------|----------|
| 0  | 0.0           | 1.000000  | 0.999998 |
| 1  | 0.1           | 0.999473  | 0.998867 |
| 2  | 0.2           | 0.998511  | 0.995496 |
| 3  | 0.3           | 0.996775  | 0.985221 |
| 4  | 0.4           | 0.993302  | 0.955191 |
| 5  | 0.5           | 0.983598  | 0.873636 |
| 6  | 0.6           | 0.956680  | 0.696310 |
| 7  | 0.7           | 0.889800  | 0.404586 |
| 8  | 0.8           | 0.671491  | 0.103029 |
| 9  | 0.9           | 0.000000  | 0.000000 |
| 10 | 1.0           | 0.000000  | 0.000000 |

FIG. 13

METHODS AND SYSTEMS FOR SEQUENTIAL MODEL INFERENCE

BACKGROUND OF THE INVENTION

Field of the Invention

The present invention relates in general to computing systems, and more particularly, to various embodiments for improving machine learning performance using sequential inferences from multiple models.

Description of the Related Art

In recent years, the use of machine learning services (or cognitive analysis) has become increasingly common in various applications, such as in Internet of Things ("IoT") environments, video surveillance, anomaly detection, object detection, etc. Generally, such services (or applications or models) are able to process or ingest new (or previously unseen) data and generate insights about the data. For example, image classifiers are able to identify the kinds of objects that appear in images, speech recognition models can detect words from audio samples, etc. However, in many practical applications, the ability of the utilized model to extract the target information is not the only indicator of performance that defines the Quality of Service ("QoS"). For instance, many video surveillance systems have requirements regarding the minimum number of frames that need to be processed every second (i.e., frames per second (FPS)).

In at least some scenarios, the models are not able to provide relatively high (or "good") inference results while also meeting QoS constraints defined by the user (e.g., regarding inference latency). For example, a model that provides detailed results with high confidence may take a relatively long time for computation.

SUMMARY OF THE INVENTION

Various embodiments for processing data with multiple machine learning models, by a processor, are provided. Input data is received. The input data is caused to be evaluated by a first machine learning model to generate a first inference result. The first inference result is compared to at least one quality of service (QoS) parameter. Based on the comparison of the first inference result to the at least one QoS parameter, the input data is caused to be evaluated by a second machine learning model to generate a second inference result.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a visual representation of a set of predictions associated with a data set generated by a model according to an embodiment of the present invention;

FIG. 5 is a visual representation of ground truth annotations associated with the data set of FIG. 4;

FIG. 7 is a table showing levels of recall and precision associated with scores of the predictions of FIG. 4;

FIG. 13 is a table showing the precision and score generated from processing an exemplary test data set;

DETAILED DESCRIPTION OF THE DRAWINGS

Figure 1:
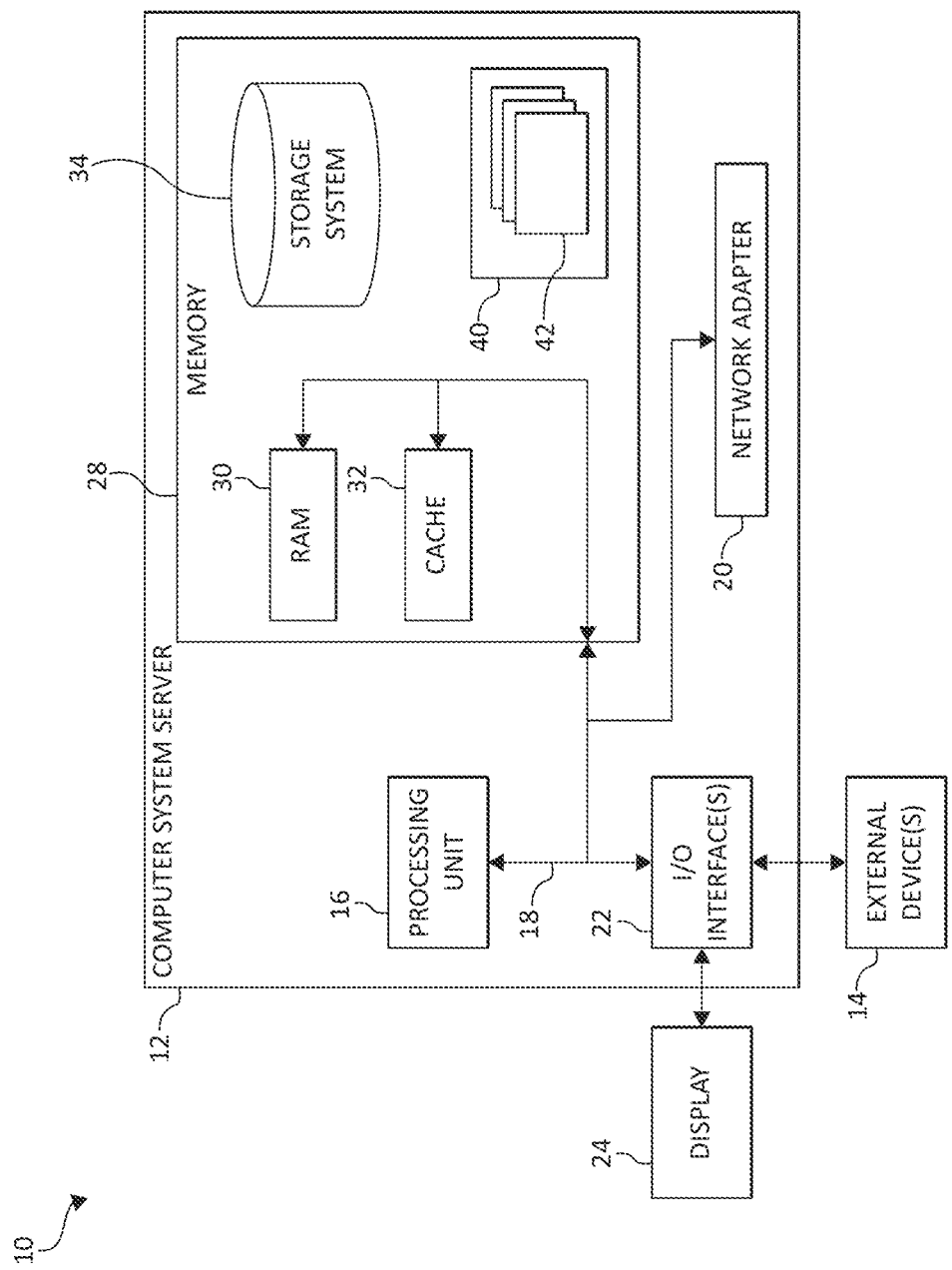
FIG. 1 is a block diagram depicting an exemplary computing node according to an embodiment of the present invention.

As discussed above, in recent years, the use of machine learning services (or cognitive analysis) has become increasingly common in various applications, such as in Internet of Things ("IoT") environments, video surveillance, anomaly detection, object detection, etc. Generally, such services (or applications or models) are able to process or ingest new (or previously unseen) data and generate insights about the data. For example, image classifiers are able to identify the kinds of objects that appear in images, speech recognition models can detect words from audio samples, etc. However, in many practical applications, the ability of the utilized model to extract the target information is not the only indicator of performance that defines the Quality of Service ("QoS"). For instance, many video surveillance systems have requirements regarding the minimum number of frames that need to be processed every second (i.e., frames per second (FPS)).

In at least some scenarios, the models are not able to provide relatively high (or "good") inference results while also meeting QoS constraints defined by the user (e.g., regarding inference latency). For example, a model that provides detailed results with high confidence may take a relatively long time for computation.

Generally, the current state of the art focuses on optimizing the accuracy of machine learning models in specific scenarios, such as object detection or classification, speech recognition, etc). However, little, if any, effort has been applied to developing a mechanism to provide different levels of QoS at inference time.

To address these needs and/or the shortcomings in the prior art, in some embodiments described herein, methods and/or systems are disclosed that, for example, leverage multiple models with different levels of accuracy and achievable QoS. In other words, in some embodiments, improvements to machine learning performance are provided utilizing sequential inferences from various models. In particular, in some embodiments, the scoring of an inference service is improved while better decision control (e.g., with respect to QoS) is provided to the user.

In some embodiments, the methods and systems described herein provide for the computing (or calculating) of different levels of QoS based on, for example, model fitness and latency of inference experienced. Additionally, an inference system capable of "handing off" a user request to different (e.g., second, third, fourth, etc.) models may be provided. Although embodiments described herein may be applicable in manner different scenarios, the greatest benefit may be provided in applications in which continuously received input data is classified, clustered, detected, etc. (e.g., object detection, information retrieval, etc.) while particular QoS parameters (e.g., with respect to latency, precision, recall, etc.) are respected (or met, adhered to, maintained, etc.).

The methods and systems described herein may allow the user (e.g., the end-user) to specify QoS parameters at runtime and provide for the routing of requests to different inference services based on the level of QoS required. In other words, in some embodiments, the user is provided with the ability to define a desirable level of QoS to be respected in the evaluation of the inference result. Additionally, a mechanism of inference utilizing a sequence of machine learning algorithms (or multiple machine learning or inference models) driven by QoS parameters may be provided. In some embodiments, the methods and systems described herein may utilize any available machine learning models suitable for the specific application in question (e.g., object detection, classification, speech recognition, etc.), as will be appreciated by one skilled in the art.

For the purposes of this description, "model" may refer to any algorithm (e.g., machine learning algorithm/model) capable of providing information (or insight(s), inference(s), prediction(s), etc.) with respect to (new) input data (e.g., video frames, images, etc.), as is commonly understood in the art. "Precision" may refer to a measure of "exactness," such as the number of relevant responses within the entire set of responses returned. "Recall" may refer to a measure of "completeness," such as the number of responses actually returned out of all of the responses that should have been returned. A "precision-recall (PR) curve" may indicate (e.g., in the form of a representation, such as a graph of curve) the tradeoff between precision and recall for different thresholds applied to an inference result. "Model accuracy" may be indicative of the ability of a model to provide exact and complete responses. "Inference score" may be a normalized value (e.g., in the range [0,1]) that represents the confidence in an inference result. "Average precision (AP)" may be the mean value of precision measured at multiple values of recall. "Quality of Service (QoS)" may refer to functional and non-functional requirements. An example of QoS may be average response time (or average inference latency), model precision, model recall, or a combination thereof.

At least some of the aspects of functionality described herein may be performed utilizing a cognitive analysis (or machine learning technique). The cognitive analysis may include natural language processing (NLP) or a NLP technique, such classifying natural language, analyzing tone, and analyzing sentiment (e.g., scanning for keywords, key phrases, etc.) with respect to, for example, content (or data), communications sent to and/or received by users, and/or other available data sources. In some embodiments, natural language processing (NLP), Mel-frequency cepstral coefficients (MFCCs) (e.g., for audio content detected by a microphone), and/or region-based convolutional neural network (R-CNN) pixel mapping (e.g., for object detection/classification in images/videos), as are commonly understood, are used. As such, although some embodiments described herein are described with respect to computer vision techniques (e.g., object detection), it should be understood that the methods and systems described herein may be applied to other types of machine learning models (e.g., related to NLP, handwriting recognition, etc.).

The processes described herein may utilize various information or data sources associated with users (e.g., entities) and/or data (e.g., input data, content, etc). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, utilizing multiple machine learning models, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such a machine learning algorithm/model, chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by such computing devices.

In particular, in some embodiments, a method for processing data with multiple machine learning models, by a processor, is provided. Input data is received. The input data is caused to be evaluated by a first machine learning model to generate a first inference result. The first inference result is compared to at least one quality of service (QoS) parameter. Based on the comparison of the first inference result to the at least one QoS parameter, the input data is caused to be evaluated (e.g., conditionally evaluated, based on the comparison) by a second machine learning model to generate a second inference result.

The input data may include at least one data item (e.g., at least one image). Each of the first machine learning model and the second machine learning model may be configured to perform the same prediction task (e.g., object detection, object classification, or any other suitable machine learning process/technique).

The causing of the input data to be evaluated by the second machine learning model to generate a second inference result based on the comparison of the first inference result to the at least one QoS parameter may include providing the first inference result to a user if the first inference result meets the at least one QoS parameter.

The causing of the input data to be evaluated by the second machine learning model to generate a second inference result based on the comparison of the first inference result to the at least one QoS parameter may further include causing the input data to be evaluated by the second learning model if the first inference result does not meet the at least one QoS parameter and providing the second inference result to the user.

The at least one QoS parameter may be received from a user. The at least one QoS parameter may be associated with, for example, at least one of latency, precision, and recall.

The first machine learning model may be implemented utilizing a first computing device, and the second machine learning model is implemented utilizing a second computing device. The second computing device may be remote from the first computing device and in operable communication with the first computing device via a communications network (e.g., on the "cloud"). However, in some embodiments, the first machine learning model and the second machine learning model may be implemented on the same computing device or separate, local computing devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
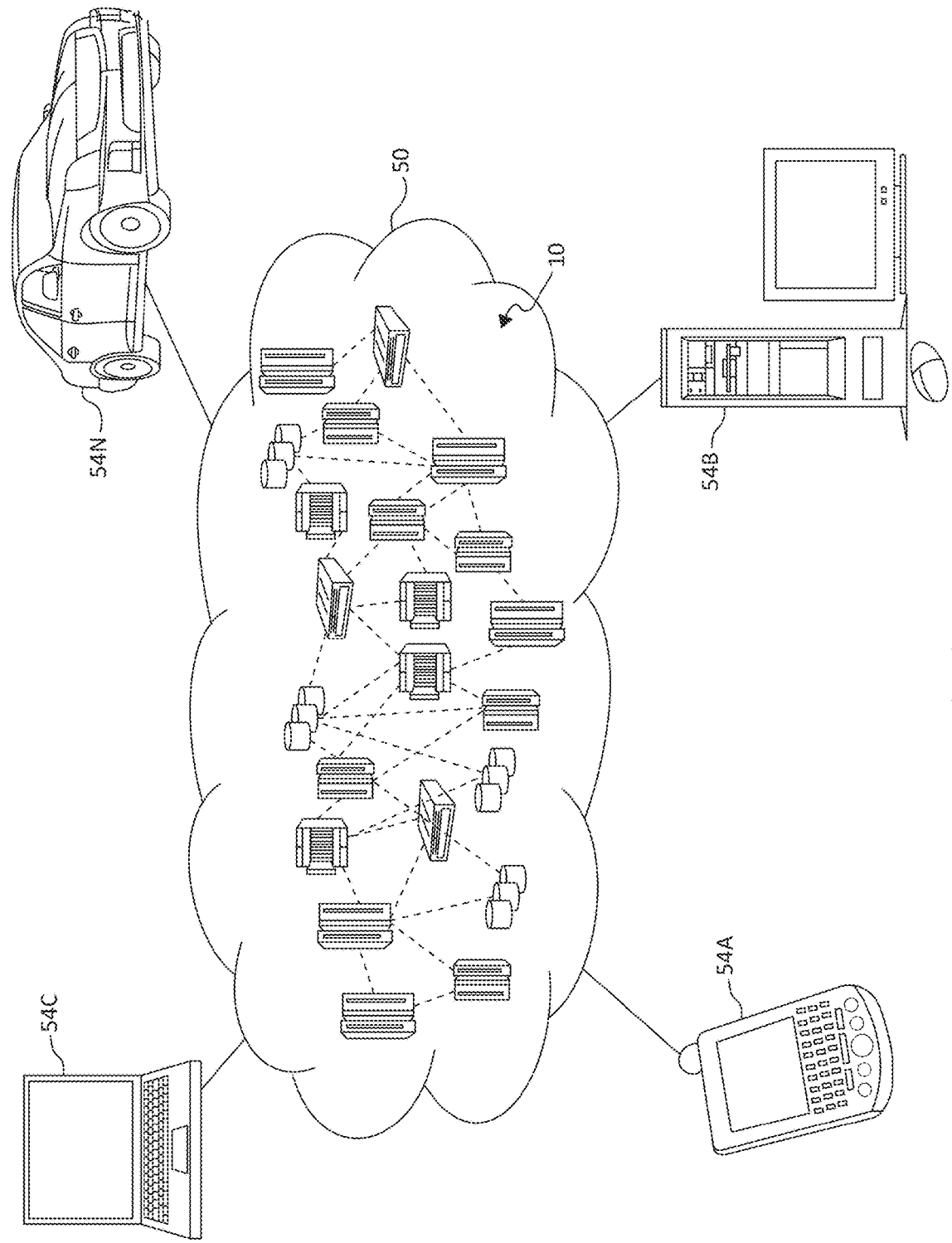
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
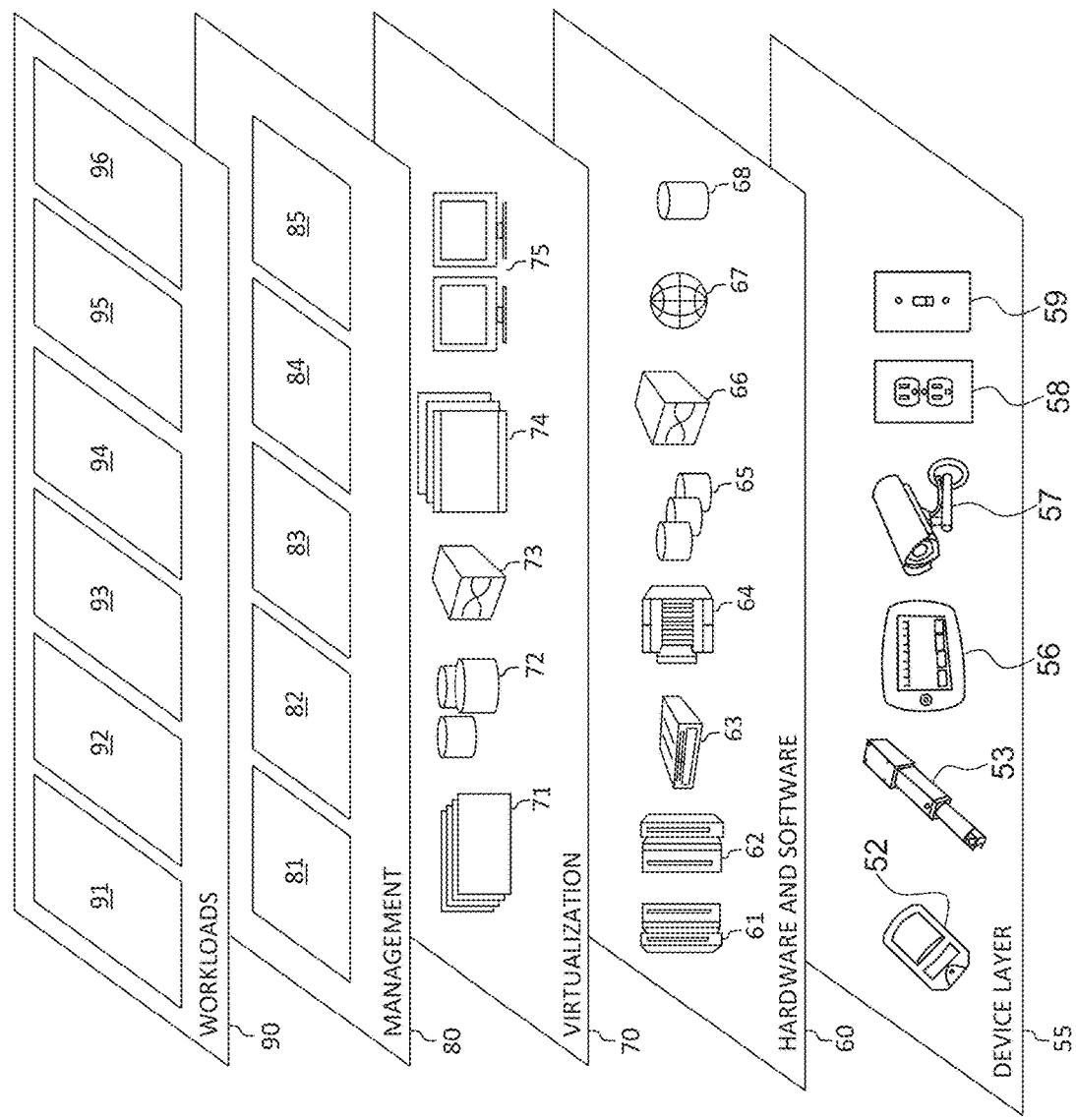
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for utilizing multiple machine learning models, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided that, for example, leverage multiple models with different levels of accuracy and achievable QoS. In other words, in some embodiments, improvements to machine learning performance are provided utilizing sequential inferences from various models. In particular, in some embodiments, the scoring of an inference service is improved while better decision control (e.g., with respect to QoS) is provided to the user. In some embodiments, the computing (or calculating) of different levels of QoS based on, for example, model fitness and latency of inference experienced is provided. Additionally, an inference system capable of "handing off" a user request to different (or second, third, fourth, etc.) models may be provided.

In some embodiments, the level of QoS that may be expected when two or more networks (or models) are utilized together to classify, detect, etc. elements in input data is evaluated. As a particular example, it should be assumed that the input data includes a single category to be identified. However, the procedure may be repeated in scenarios in which multiple classes are present (e.g., by repeating the procedure for each class).

For example, with respect to one aspect of the embodiments described herein, a method for processing data with multiple machine learning models, by a processor, is provided. Input data is received. The input data is caused to be evaluated by a first machine learning model to generate a first inference result. The first inference result is compared to at least one QoS parameter (e.g., user-defined, received from a user, etc.). Based on the comparison of the first inference result to the at least one QoS parameter, the input data is caused to be evaluated by a second machine learning model to generate a second inference result.

The input data may include at least one image, such as a series of video frames. Each of the machine learning models may be configured to perform, for example, object detection, object classification, motion detection, etc. The at least one QoS parameter may be associated with, for example, latency, precision, recall, etc.

If the first inference result meets the at least one QoS parameter, the first inference result may be provided to a user (as opposed to having the input data evaluated by the second model). In other words, in some embodiments, the input data is only evaluated by the second machine learning model if the first inference result does not meet the at least one QoS parameter.

The first machine learning model may be implemented utilizing a first computing device, and the second machine learning model is implemented utilizing a second computing device. The second computing device may be remote from the first computing device and in operable communication with the first computing device via a communications network.

With respect to the performance of multiple machine learning models, consider two models, Model A and Model B, where the average precision of Model A is significantly greater than that of Model B (AP(A)>>AP(B)), and the latency of Model A is significantly greater (or longer) than that of Model B (latency(A)>>latency(B)). For each model (e.g., Model A and Model B), all of the available annotations (or labels) produced by running an inference process over the entirety of a test data set are collected (or calculated) utilizing the models. Given the entire set of annotations, the precision and scores for each of the models (MPA, MPB, MSA, and MSB), along with corresponding precision maps and score maps resulting from the computation of the PR curves, may be defined, as described in greater detail below.

After the models are trained and validated, as a part of a testing procedure, each model is evaluated using a test data set. The test data set includes samples that the model has not previously processed (or "seen"). FIG. 4 is a simplified illustration of an exemplary set 400 of predictions (or inferences) generated by a model after evaluating a test data set. In the example shown, the set 400 includes 22 predictions 402, each of which has been assigned a score (e.g., shown as a numeric value within each prediction 402, such as 0.99, 0.82, 0.33, etc.). FIG. 5 is a simplified illustration of the "ground truth" 500 (or ground truth annotations) for the test data set. As shown, the ground truth includes 10 annotations 502. As will be appreciated by one skilled in the art, ground truth represents the labels used to annotate input data (e.g., images) for the training of a machine learning model. Essentially during training, the model may be validated against some known data and the ground truth is compared with the inference result to measure the model accuracy. Each of the annotations 502 may be created manually (e.g., by humans, individuals, etc.) and include a label, classification, etc. for a respective one of the samples in the test data set (e.g., "person," "vehicle," etc., such as in the case of object detection or classification).

Figure 6:
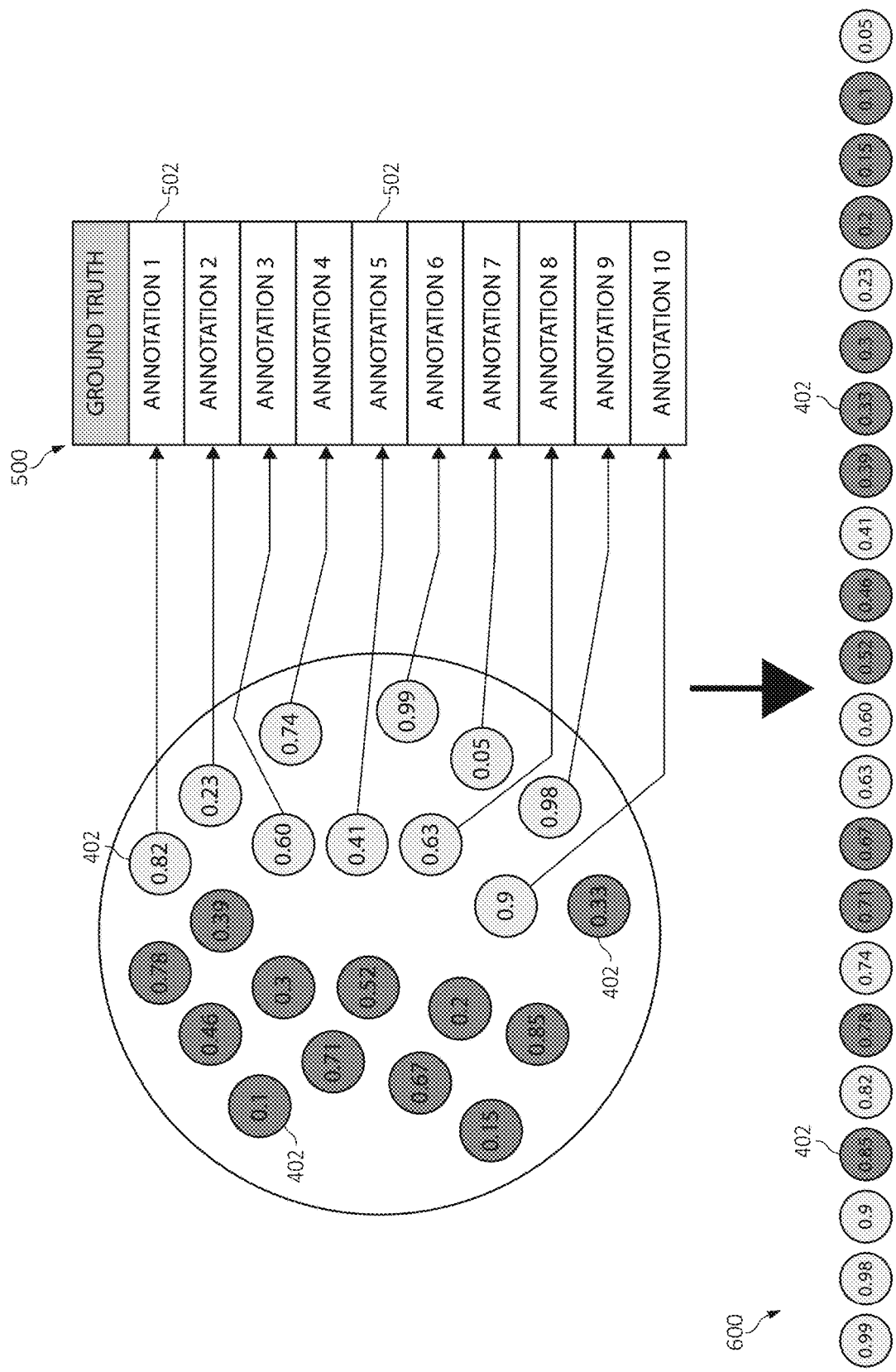
FIG. 6 is a visual representation of a mapping between the predictions of FIG. 4 and the ground truth annotations of FIG. 5, along with a ranking of the predictions.

Using a comparison function (e.g., Intersection over Union (IoU) for object detection), at least some of the predictions 402 in FIG. 4 may be associated with (or corresponded to) particular annotations 502 in FIG. 5. An example of such is illustrated in FIG. 6, which shows a "mapping" of some of the predictions 402 to the annotations 502. More specifically, in the example shown, 10 of the predictions 402 may be associated with (or "match") a respective one of the annotations 502 (or vice versa). For sake of clarity, the 10 predictions 402 that are associated with the annotations 502 are shaded differently than the 12 predictions 402 that are not (or may not be) similarly associated with the annotations 502.

Still referring to FIG. 6, an ordered ranking (or list) 600 of the predictions 402 may be generated using the scores of the predictions 402. In the example shown, the ranking 600 has the predictions 402 arranged in order of descending scores (e.g., from left to right as shown in FIG. 6).

Utilizing the ordered ranking 600 shown in FIG. 6, a level of recall (or fraction/percentage of ground truth detected) and precision (or amount/percentage of good/valid predictions or mean AP) may be associated with each score (or score threshold). An example of such is shown in table 700 in FIG. 7. With the scores (or score thresholds) associated with recall and precision, a correlation between score and model precision/recall may be determined. For example, with the score threshold selected as 0.99, the precision is 100%, while the recall is 10%. That is, with the threshold selected as 0.99, only 1 of the 10 predictions that corresponds to an annotation is utilized. However, all of the predictions utilized (i.e., the only one utilized) correspond to an annotation. Similarly, with the threshold selected as 0.82, the precision is 80%, while the recall is 40%.

Utilizing such, for a given class, the following procedure may be performed. A lower bound (lb) may be set or utilized to prevent a significant number of requests being sent to a subsequent model even in the case of low confidence results.

For each recall level r in R, where R=[0.00, 0.1, 0.2, ..., 0.9, 1], a inference (or score) threshold (t) may be set, where t is the model's score at a certain recall level r in R. In case of Model A, t=MSA(r). A new ranked output may be created by applying a policy, as described in greater detail below, as depending on the sample and the policy defined, the output may be generated by one model or another. One or more metric may then be calculated, such as true positive, false negative, false positive, recall, precision, and the number of samples processed by each model.

A policy may be a rule or set of rules that drives (or controls) an inference mechanism. In particular, the policy may define which model returns (or should return) the response the user. A policy may be particularly important when the models return more than one result. Given an inference score that should be respected, examples of policies may include "at least one above," "all above," "none in range," "percentage above," etc. An "at least one above" policy may involve returning the response if at least one annotation is above the score. An "all above" policy may involve returning the response if all annotations are above the score. A "none in range" policy may involve returning the response if no annotation is in specific range. A "percentage above" policy may involve returning the response if a particular number (or percentage) of the annotations are above the score.

Figure 8:
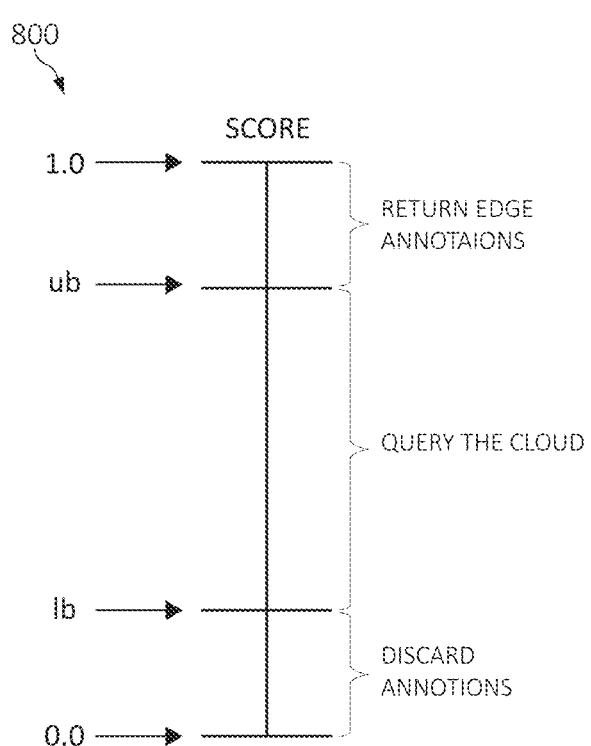
FIG. 8 is a visual representation of a policy according to an embodiment of the present invention.

FIG. 8 illustrates a representation 800 of a policy according to an embodiment of the present invention. The policy may be an "at least one in" policy, and may be applied to any scores between 0.0 and 1.0. An upper bound (ub) and a lower bound (lb) may first be set. For example, the upper bound may be set as 0.8, and the lower bound may be set as 0.1. The upper bound may correspond to a fraction or portion of the data set that are to be evaluated or detected by a first model (e.g., Model A), which may be implemented locally (e.g. in an "edge" device). For example, in operation, if all of the predictions generated by the first model have a score that is above the upper bound, the predictions generated by the first model are utilized (and returned to the user). However, if any predictions generated by the first model have a score between the upper bound and the lower bound, the data set is sent to a second model, which may be implemented remotely (e.g., on the "cloud"). In the embodiment shown, any annotations that have a score that is less than the lower bound may be discarded (or not utilized).

Figures 9, 10:
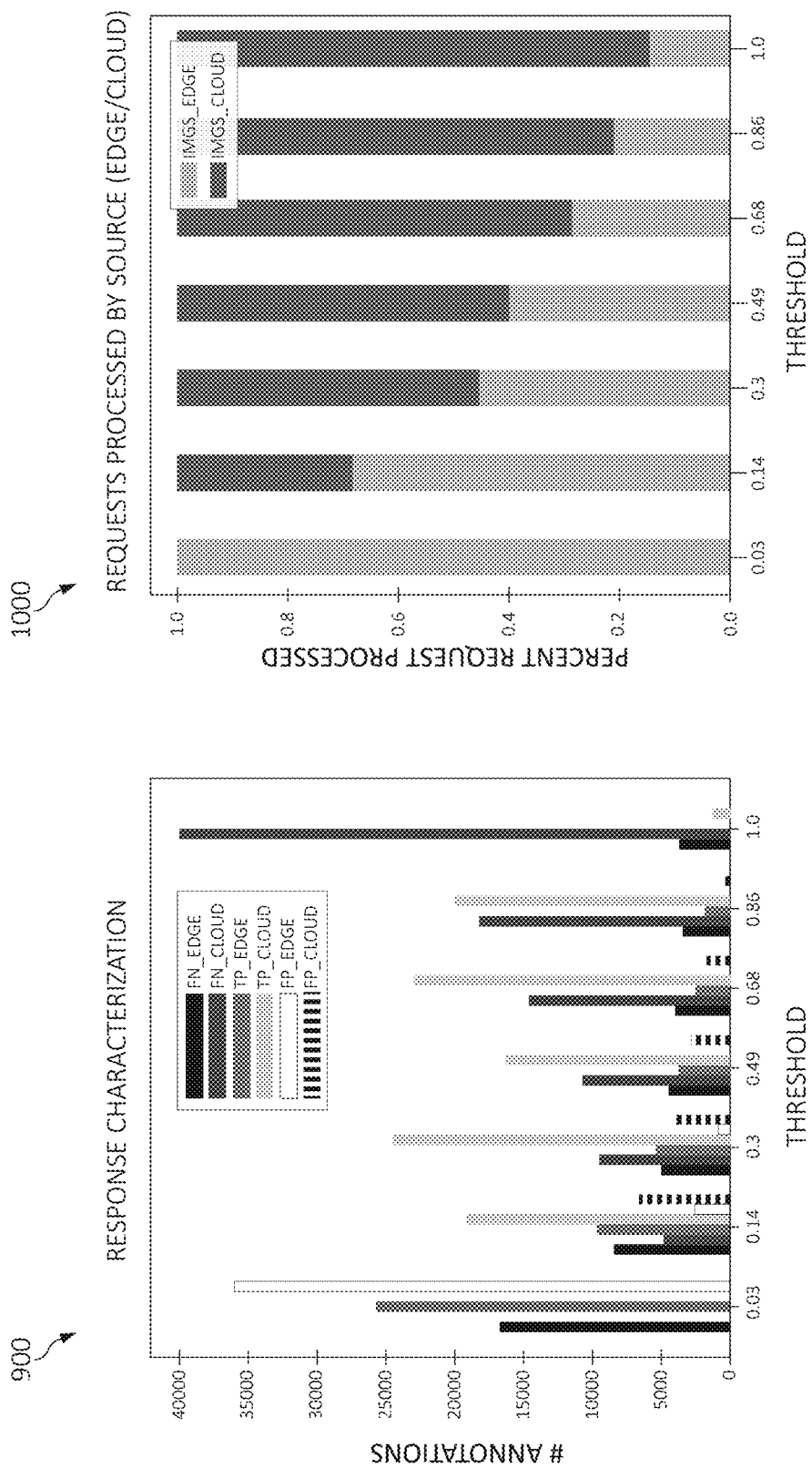
FIG. 9 is a graph illustrating a characterization of responses generated utilizing the policy of FIG. 8 with two machines learning models at various thresholds.
FIG. 10 is graph illustrating the percentage of requests that are processed by the two machines learning models of FIG. 9 at various thresholds.

FIG. 9 illustrates a graph 900 that shows the characterization of responses generated utilizing the "at least one in" policy described above with a first model (e.g., Model A or "edge model") and a second model (e.g., Model B or "cloud model") at various score thresholds. FIG. 10 illustrates a graph 1000 that shows the percentage of requests that are processed by the two models at the various score thresholds. In particular, the thresholds may correspond to an upper bound utilized in the "at least one in" policy. In FIG. 9, "fn_edge" indicates (or the lines correspond to such indicate) false negatives generated by the first model, "fn_cloud" indicates false negatives generated by the second model, " "tp_edge" indicates true positives generated by the first model, "tp_cloud" indicates true positive generated by the second model, "fp_edge" indicates false positives generated by the first model, and "fp_cloud" indicates false positives generated by the second model. As is evident in FIGS. 9 and 10, the characterization of the responses generated and the percentage of the responses handled by the two models change dramatically as the threshold is increased. As such, by computing the different measures for different threshold values, different levels of QoS may be defined and/or provided.

Figure 11:
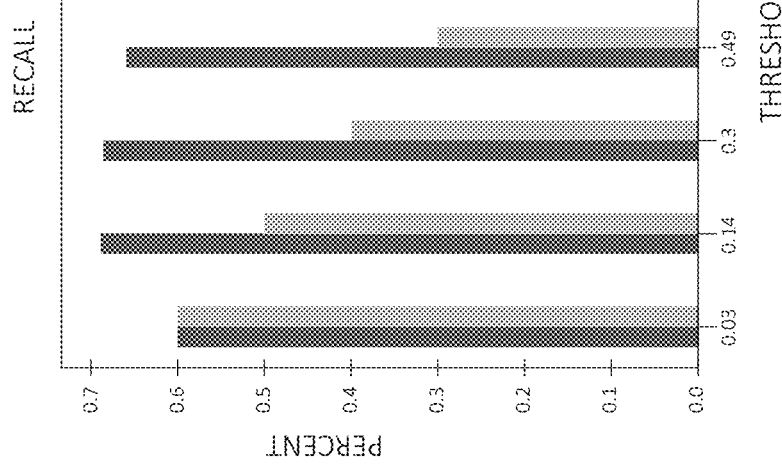
FIG. 11 is a graph illustrating the precision of the two machines learning models of FIG. 9 at various thresholds.
Figure 12:
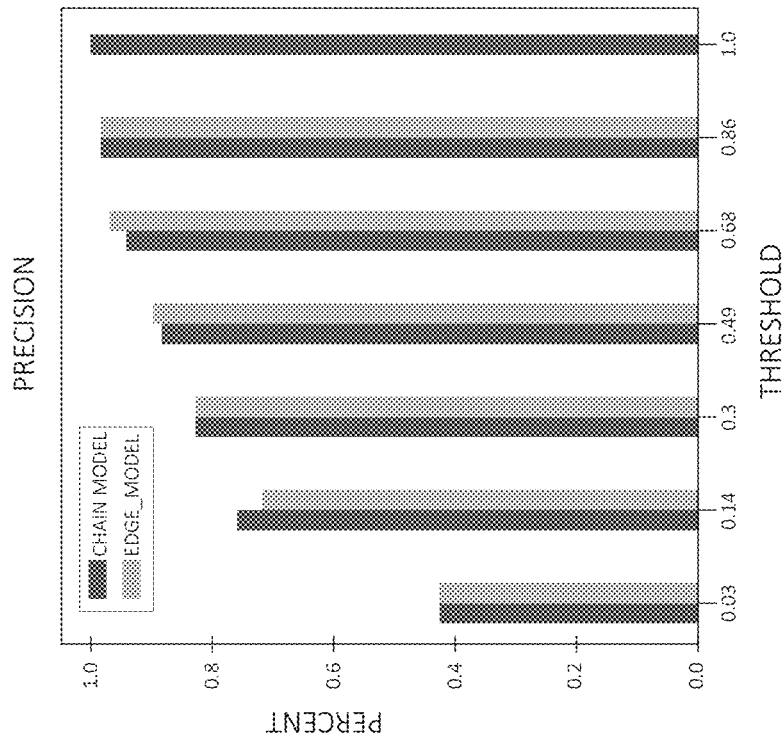
FIG. 12 is a graph illustrating the recall of the two machine learning models of FIG. 9 at various thresholds.

FIGS. 11 and 12 jointly illustrate a comparison between the performance that may be achieved utilizing a single model (e.g., Model A or "edge model") and a chain inference (e.g., utilizing both Model A and Model B or "chain model"). In particular, FIG. 11 illustrates a graph 1100 that shows the precision (as a decimal or percentage) of the two models at various score thresholds, while FIG. 12 illustrates a graph 1200 that shows the recall of the two models. The thresholds shown may correspond to the values utilized to discriminate between predictions that are kept/utilized and those that are discarded (e.g., the lower bound). As is evident in FIGS. 11 and 12, for each threshold value, the chain model provides similar levels of precision as the edge model. However, the chain model provides significantly improved recall as the threshold is increased. As a result, in such an embodiment, using the chain inference mechanism, the end user may select high threshold values and expect most of the interesting (or desired) objects to be detected. In contrast, using the single edge model, selecting a high threshold may result in most of the objects being undetected.

As alluded to above, to evaluate algorithms (or models), average precision (AP), calculated using PR curves, may be utilized. For a given task and class, the PR curve may be calculated based on a method's (or algorithm's or model's) ranked output. The AP may be considered to summarize the shape of the PR curve and may be defined as, of example, the mean precision at a set of eleven equally spaced recall levels (e.g., [0, 0.1, 0.2, ... 1]). AP may be expressed as:

$$AP = \frac{1}{11} \sum_{r \in \{0, 0.1, \ldots, 1\}} p_{interp}(r)$$

The precision at each recall level (r) may be interpolated by taking the maximum precision measured for a method (or model) for which the corresponding recall exceeds r. Such may be expressed as follows, where $p(\tilde{r})$ is the measured precision at recall $\tilde{r}$:

$$p_{interp}(r) = \max_{\tilde{r}: \tilde{r} \geq r} p(\tilde{r})$$

For each class, as a result of the definition of the PR curve on a list of ranked output, the result of the evaluation may be encapsulated in two maps, MP and MS, of dimension (R,1). With respect to MP, for each recall level (r) in R, MP(r) provides the precision associated to recall level (r). With respect to MS, for each recall level (r) in R, MS(r) provides the lowest score between all the samples associated to recall level (r). FIG. 13 illustrates an exemplary table 1300 that lists the precision (MR(r)) and score (MS(r)) generated from processing a test data set (e.g., Common Objects in Context (COCO) API's, as is commonly understood, on class "person") with a model. As shown in FIG. 4, a precision value and score is associated with each recall lever (e.g., 0.0, 0.1, ... 1.0). It should be noted that both precision and score decrease monotonically as the recall level increases.

Figure 14:
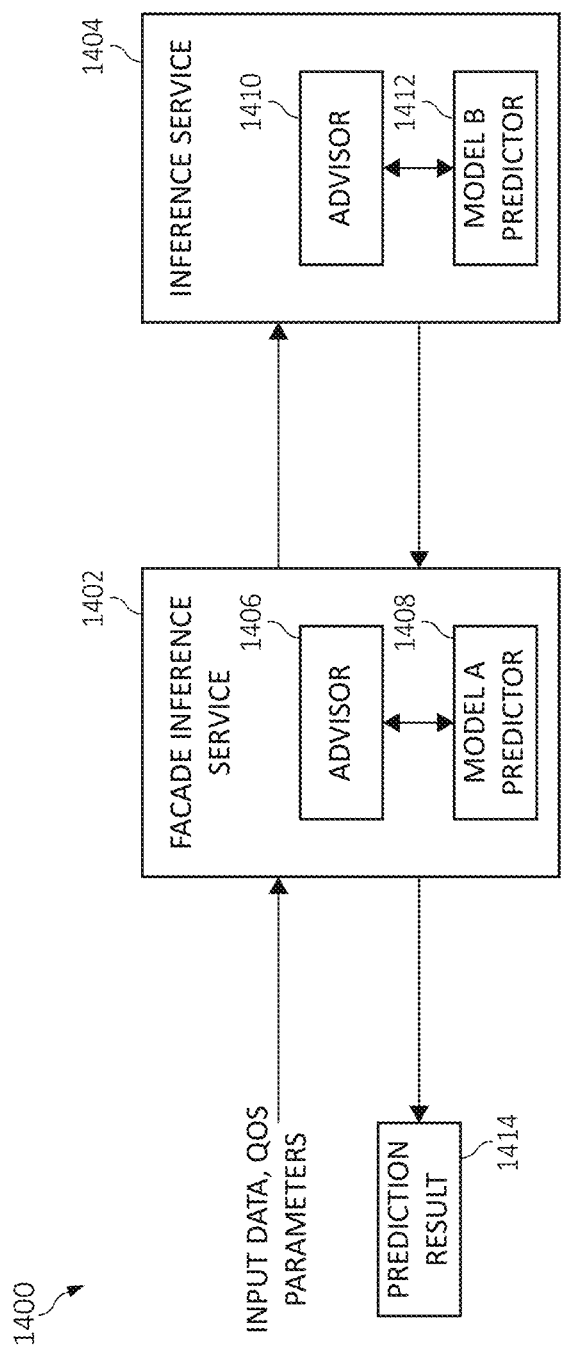
FIG. 14 is a block diagram of a computing system according to an embodiment of the present invention.

FIG. 14 illustrates a computing system (or environment) 1400 according to an embodiment of the present invention. The system 1400 includes a facade inference service (or module) 1402 and an inference service (or module) 1404, each of which may be implemented utilizing any suitable computing device, such as those described above. In some embodiments, the inference service 1404 is located remotely from the facade inference service 1402 (i.e., on a second computing device) and in operable communication therewith via any suitable communications network (e.g., the Internet). However, in some embodiments, the inference service 1404 (and/or second model) may be located locally (e.g., on the same computing device as the facade inference service 1402 or first model, or a second, local computing device). Additionally, although only one inference service 1404 is shown, in some embodiments, multiple such services/modules are included and/or available (e.g., in instances in which requests are sent to multiple, additional models).

In the example shown, the facade inference service 1402 includes an advisor module 1406 and a Model A predictor 1408, and the inference service 1404 similarly includes an advisor module 1410 and a Model B predictor 1412. The facade inference service 1402 may be suitably configured to receive input from a user, such as input data (e.g., video, video frames, etc.) and QoS parameters (e.g., provided via a user input device). The advisor module 1406 of the facade inference service 1402 may collect the input data and the QoS parameters and interact with the Model A predictor 1408 to obtain inference results utilizing Model A. The advisor module 1406 may then apply an appropriate policy (e.g., user-defined) based on the received QoS parameters. Based on the policy and/or if appropriate, the advisor module 1406 may forward a request to the next inference service in the system 1400, such as inference service 1404. The inference service 1404 may function in a similar manner and utilize Model B to obtain inference results, which may be sent back to the facade inference service 1402. The advisor module 1406 may collect the final results (or prediction result 1414) and forward (or provide) them to the user (or client). In this manner, the received input data may be processed by multiple, sequential machine learning models. As a result, improved control of the inference results returned may be achieved while masking the complexity of evaluating the performance of the inference service. Additionally, a compromise between different levels of accuracy and latency to meet specified QoS requirements may be obtained.

Figure 15:
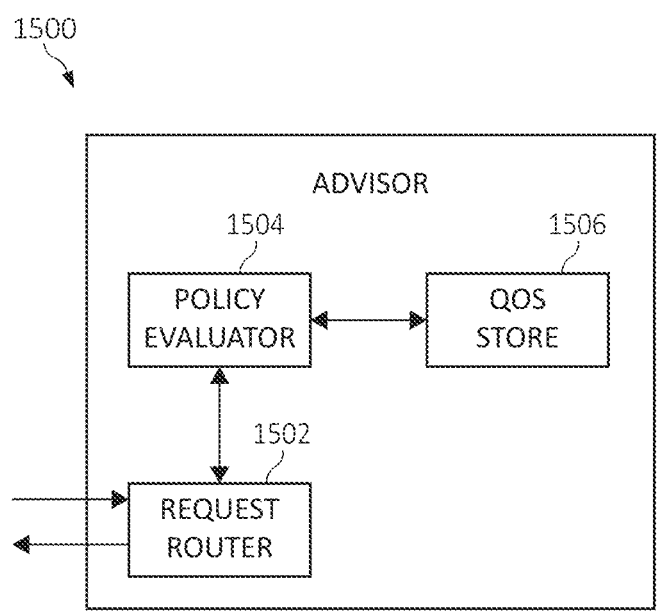
FIG. 15 is a block diagram of an advisor module within the computing system of FIG. 14 according to an embodiment of the present invention.

FIG. 15 illustrates an advisor module 1500 in greater detail. The advisor module 1500 in FIG. 15 may be similar to advisor module 1406 in FIG. 14. As shown, the advisor module 1500 includes a request router 1502, a policy evaluator 1504, and a QoS store 1506. The request router 1502 may facilitate the exchange of messages, requests, data, etc. between the user (or client) and other inference services. The policy evaluator 1504 may define (or determine, calculate, etc.) the score that meets the received QoS parameters (or requirements) and apply the policy. The QoS store 1506 may store a collection of metrics related to the system, such as recall, precision, false positives, etc.).

As one example of an implementation of the methods and systems described herein, consider an environment, such as a building, in which multiple cameras are deployed and in operable communication via a single network (e.g., a local area network (LAN)). Each of the cameras may be connected to or integrated within an edge computing device that is used to (locally) process received/detected images. In particular, each edge device may be configured with an edge inference service that is equipped to utilize an object detection model (or other machine learning model) and suitably detect objects captured in the images (or video frames). The edge inference service may also include a request handler (or advisor, such as that described above) that may evaluate the results returned from the object detection model.

Figure 16:
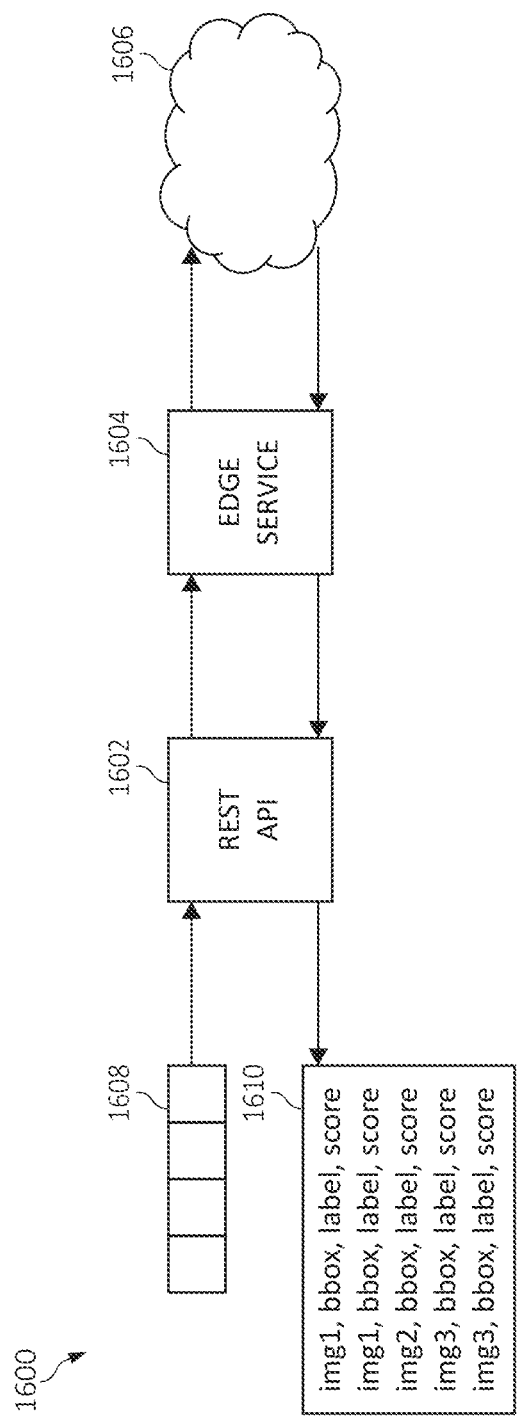
FIG. 16 is a block diagram of a computing system according to an embodiment of the present invention.

If the confidence results do not meet the threshold (or defined QoS parameters), the request handler may forward requests to a cloud connector that causes a cloud inference service (and/or second object detection model) to be utilized to evaluate or process the images. The results of the processing with the cloud inference service may then be returned to the user. However, if the confidence results meet/exceed the threshold, the response/result from the edge object detection model is utilized and provided to the user. FIG. 16 illustrates an example of a system 1600 that may be utilized in such a scenario.

Still referring to FIG. 16, the system 1600 includes a rest API 1602, an edge service 1604, and a cloud platform 1606. As shown, a frame buffer 1608 may be provided as input. The frame buffer 1608 may include a one or more video frames or images (e.g., detected by one or more cameras) to be processed (e.g., via object classification, object detection, etc.). The rest API 1602 may provide the user with an interface to (or mechanism of interaction with) the edge service (or edge inference service) 1604 (e.g., a public endpoint/node to interrogate/utilize the edge service 1604). The rest API 1602 may also receive (or retrieve) the request from the user (e.g., including the frame buffer 1608 and QoS parameters), forward the request to the edge service 1604, and return the response/result 1610 to the user. The request from the user may include, for example, a buffer URL (e.g., in instances in which the rest API 1602 and/or the edge service 1604 retrieves the input data from an online source) and one or more metrics to be respected (e.g., QoS parameters), such as a minimum recall, latency requirements, false positive rate, etc.

The edge service 1604 may be implemented in any suitable computing device (e.g., perhaps integrated into the same device as the rest API 1602) and is configured process the input data (e.g., the frame buffer 1608) with a (first) machine learning model (e.g., an object classification model). If determined to be appropriate, the edge service 1604 may also interact with the cloud platform (or remote cloud platform) 1606 to request that the input data be processed with another (e.g. a second) machine learning model. As such, the cloud platform 1606 may include, for example, remote services/systems deployed in a cloud infrastructure, which are configured to process the input data with the second (or third, fourth, etc.) machine learning model. It should be noted that because of the potentially (nearly) unlimited resource constraints of such a service (e.g., on the cloud), the accuracy of inferences generated by such a system may exceed that of the edge service 1604 (e.g., implemented locally, on a single device, etc.).

Figure 17:
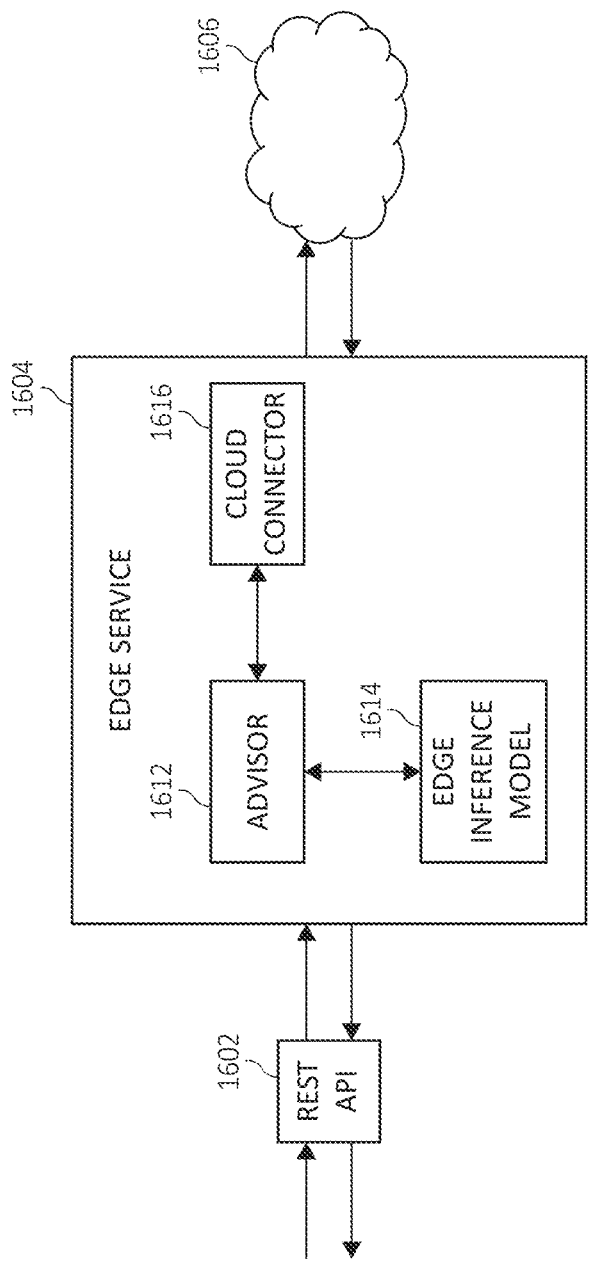
FIG. 17 is a block diagram of a portion of the computing system of FIG. 16, showing an edge service thereof in greater detail, according to an embodiment of the present invention.

FIG. 17 illustrates a portion of the system 1600 of FIG. 16, in particular, the edge service 1604, in greater detail. As shown, the edge service 1604 includes an advisor (or advisor module) 1612, an edge inference model 1614, and a cloud connector 1616. The advisor 1612 may receive the input data (e.g., frame buffer 1608) and the QoS parameters, evaluate the result of the inference, and based on the input parameters, reroute the response to the user or forward the input data to the cloud connector 1616 for a more specific classification (or to be processed by a second model), and generate a set of labels that respect the user-defined constraints (e.g., the QoS parameters). The edge inference model 1614 may include a machine learning model that is capable of, for example, inferring or detecting objects appearing in the input data (e.g., video frames) and providing insight about the position of the objects. The cloud connector 1616 may connect the local service to the cloud platform 1606, forward the input data to the cloud platform 1606 (e.g., in case of unsatisfying result from the edge inference model 1614), and receive inference results from the cloud platform (or a machine learning model deployed thereon).

Still referring to FIG. 17, although not shown in detail, the advisor 1612 may include a policy evaluator, a QoS store, and a request router, similar to the advisor 1500 shown in FIG. 15. In a similar manner, after the input data has been processed utilizing the local model (e.g., edge inference model 1614), the policy evaluator determines if the result thereof respects the constraints set by the user in the request (e.g., the QoS parameters). Based on the QoS parameters, the policy evaluator queries the QoS store for the score that meets the requirement. When the score is retrieved, the policy evaluator applies the appropriate policy. If the result respects the policy picked, the result is returned to the user. Otherwise, the request is rerouted to the cloud platform 1606, as described above.

As such, in some embodiments, systems (and/or methods) are provided that determine the level of QoS achievable by inference services (or models) when the responses are combined following a policy or QoS parameters. The systems may be configured to compute or determine expected performance, based on defined metrics, for a set of models performing inferences in sequence. Mechanisms for threshold computation for one or more model performing inferences in sequence may also be provided, routing inference requests to different models based on policies, and selecting an inference threshold based on specified QoS parameters may also be provided. Additionally, the system may evaluate inference results at runtime (or in "real-time") and redirect requests to different models based on the threshold(s) selected.

Figure 18:
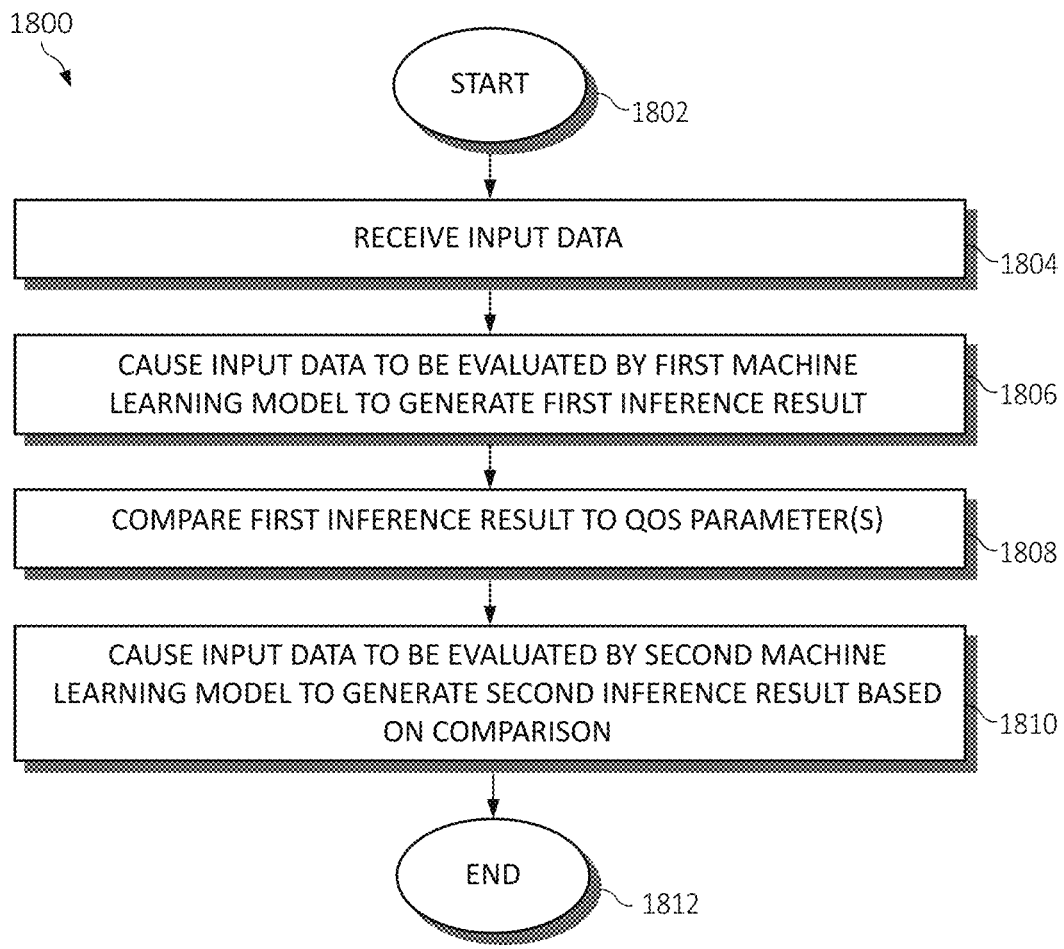
FIG. 18 is a flowchart diagram of an exemplary method for utilizing multiple machine learning models according to an embodiment of the present invention.

Turning to FIG. 18, a flowchart diagram of an exemplary method 1800 for utilizing multiple (or sequential) machine learning models is provided. The method 1800 begins (step 1802) with, for example, multiple machine learning models being trained and evaluated (e.g., with respect to the appropriate functionality, such as object detection, classification, etc.) and being implemented on one or more computing devices, as described above.

Input data is received (step 1804). The input data may include, for example, one or more images (e.g., video frames), such as in a frame buffer.

The input data is caused to be evaluated by a first machine learning model to generate a first inference result (or first set of inference results) (step 1806). The first machine learning model may be configured to perform, for example, at least one of object detection and object classification and may be implemented on a first computing device.

The first inference result is compared to at least one quality of service (QoS) parameter (step 1808). The at least one QoS parameter may be received from a user. The at least one QoS parameter may be associated with at least one of latency, precision, and recall (i.e., associated with the inference result(s)).

Based on the comparison of the first inference result to the at least one QoS parameter, the input data is caused to be evaluated (e.g., conditionally evaluated, based on the comparison) by a second machine learning model to generate a second inference result (or second set of inference results) (step 1810). In other words, if the first inference result does not meet (or respect, adhere to, etc.) the QoS parameter(s), the input data may be caused to be evaluated by the second learning model, thus generating a second inference result. However, if the first inference result meets the QoS parameter(s), the first inference result may be utilized (and provided to the user). The second machine learning model may be configured to perform, for example, at least one of object detection and object classification (e.g., similar to the first machine learning model) and implemented utilizing a second computing device (e.g., remote from the first computing device and in operable communication with the first computing device via a communications network).

Method 1800 ends (step 1812) with, for example, the appropriate inference result being provided to a user (e.g., via a computing device, display screen, electronic communication, etc.). In some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for processing data with multiple machine learning models, by a processor, comprising:
    receiving input data;
    causing the input data to be evaluated by a first machine learning model to generate a first inference result;
    comparing the first inference result to at least one quality of service (QoS) parameter; and
    based on said comparison of the first inference result to the at least one QoS parameter, causing the input data to be conditionally evaluated by a second machine learning model to generate a second inference result.

2. The method of claim 1, wherein the input data comprises at least one data item, and wherein each of the first machine learning model and the second machine learning model is configured to perform the same prediction task.

3. The method of claim 1, wherein the causing of the input data to be evaluated by the second machine learning model to generate a second inference result based on said comparison of the first inference result to the at least one QoS parameter includes providing the first inference result to a user if the first inference result meets the at least one QoS parameter.

4. The method of claim 3, wherein the causing of the input data to be evaluated by the second machine learning model to generate a second inference result based on said comparison of the first inference result to the at least one QoS parameter further includes:
    causing the input data to be evaluated by the second learning model if the first inference result does not meet the at least one QoS parameter; and
    providing the second inference result to the user.

5. The method of claim 1, further comprising receiving the at least one QoS parameter from a user, and wherein the at least one QoS parameter is associated with at least one of latency, precision, and recall.

6. The method of claim 1, wherein the first machine learning model is implemented utilizing a first computing device, and the second machine learning model is implemented utilizing a second computing device.

7. The method of claim 6, wherein the second computing device is remote from the first computing device and in operable communication with the first computing device via a communications network.

8. A system for processing data with multiple machine learning models comprising:
    a processor executing instructions stored in a memory device, wherein the processor:
        receives input data;
        causes the input data to be evaluated by a first machine learning model to generate a first inference result;
        compares the first inference result to at least one quality of service (QoS) parameter; and
        based on said comparison of the first inference result to the at least one QoS parameter, causes the input data to be conditionally evaluated by a second machine learning model to generate a second inference result.

9. The system of claim 8, wherein the input data comprises at least one data item, and wherein each of the first machine learning model and the second machine learning model is configured to perform the same prediction task.

10. The system of claim 8, wherein the causing of the input data to be evaluated by the second machine learning model to generate a second inference result based on said comparison of the first inference result to the at least one QoS parameter includes providing the first inference result to a user if the first inference result meets the at least one QoS parameter.

11. The system of claim 10, wherein the causing of the input data to be evaluated by the second machine learning model to generate a second inference result based on said comparison of the first inference result to the at least one QoS parameter further includes:
   causing the input data to be evaluated by the second learning model if the first inference result does not meet the at least one QoS parameter; and
   providing the second inference result to the user.

12. The system of claim 8, wherein the processor further receives the at least one QoS parameter from a user, and wherein the at least one QoS parameter is associated with at least one of latency, precision, and recall.

13. The system of claim 8, wherein the first machine learning model is implemented utilizing a first computing device, and the second machine learning model is implemented utilizing a second computing device.

14. The system of claim 13, wherein the second computing device is remote from the first computing device and in operable communication with the first computing device via a communications network.

15. A computer program product for processing data with multiple machine learning models, by a processor, the computer program product embodied on a non-transitory computer-readable storage medium having computer-readable program code portions stored therein, the computer-readable program code portions comprising:
   an executable portion that receives input data;
   an executable portion that causes the input data to be evaluated by a first machine learning model to generate a first inference result;
   an executable portion that compares the first inference result to at least one quality of service (QoS) parameter; and
   an executable portion that, based on said comparison of the first inference result to the at least one QoS parameter, causes the input data to be conditionally evaluated by a second machine learning model to generate a second inference result.

16. The computer program product of claim 15, wherein the input data comprises at least one data item, and wherein each of the first machine learning model and the second machine learning model is configured to perform the same prediction task.

17. The computer program product of claim 15, wherein the causing of the input data to be evaluated by the second machine learning model to generate a second inference result based on said comparison of the first inference result to the at least one QoS parameter includes providing the first inference result to a user if the first inference result meets the at least one QoS parameter.

18. The computer program product of claim 17, wherein the causing the of input data to be evaluated by the second machine learning model to generate a second inference result based on said comparison of the first inference result to the at least one QoS parameter further includes:
   causing the input data to be evaluated by the second learning model if the first inference result does not meet the at least one QoS parameter; and
   providing the second inference result to the user.

19. The computer program product of claim 15, wherein the computer-readable program code portions further include an executable portion that receives the at least one QoS parameter from a user, and wherein the at least one QoS parameter is associated with at least one of latency, precision, and recall.

20. The computer program product of claim 15, wherein the first machine learning model is implemented utilizing a first computing device, and the second machine learning model is implemented utilizing a second computing device.

21. The computer program product of claim 20, wherein the second computing device is remote from the first computing device and in operable communication with the first computing device via a communications network.

* * * * *